US012033825B2

(12) United States Patent
Manev et al.

(10) Patent No.: US 12,033,825 B2
(45) Date of Patent: Jul. 9, 2024

(54) SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

(71) Applicant: Hitachi Energy Ltd, Zürich (CH)

(72) Inventors: Georgi Manev, Sofia (BG); Todor Kokev, Sofia (BG); Angel Mihaylov, Plovdiv (BG)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/020,459

(22) PCT Filed: Jun. 18, 2021

(86) PCT No.: PCT/EP2021/066664
§ 371 (c)(1),
(2) Date: Feb. 9, 2023

(87) PCT Pub. No.: WO2022/083902
PCT Pub. Date: Apr. 28, 2022

(65) Prior Publication Data
US 2023/0230781 A1 Jul. 20, 2023

(30) Foreign Application Priority Data
Oct. 21, 2020 (EP) .................................... 20202954

(51) Int. Cl.
*H01H 9/00* (2006.01)
*H01H 3/44* (2006.01)

(52) U.S. Cl.
CPC ............ *H01H 9/0027* (2013.01); *H01H 3/44* (2013.01)

(58) Field of Classification Search
CPC .......... H01H 9/0027; H01H 3/44; H01H 9/00; H01H 3/40; H01H 19/00; H01H 21/00; H01H 3/30; H01H 13/72
(Continued)

(56) References Cited

U.S. PATENT DOCUMENTS 3,858,016 A * 12/1974 Baumgartner ....... H01H 9/0027 200/411

FOREIGN PATENT DOCUMENTS

CN 2591739 Y 12/2003
CN 103430267 A 12/2013
(Continued)

OTHER PUBLICATIONS

International Search Report and Written Opinion of the International Searching Authority, PCT/EP2021/066664, mailed Sep. 30, 2021, 13 pages.
(Continued)

*Primary Examiner* — Renee S Luebke
*Assistant Examiner* — Iman Malakooti
(74) *Attorney, Agent, or Firm* — Sage Patent Group

(57) ABSTRACT

A switching system for an on-load tap changer includes: a Geneva mechanism, wherein the Geneva mechanism includes: a rotatable ring with a recess, a connector, the connector being rotatable together with the rotatable ring to electrically connect with a tap of the tap changer, and a rotatable driving wheel, wherein the driving wheel comprises a holding disk and a lever, the holding disk being rotatable around a longitudinal axis and wherein the lever is slidable radial to the longitudinal axis relative to the holding disk, and wherein the lever is coupleable with the recess to rotate the rotatable ring.

17 Claims, 4 Drawing Sheets

(58) Field of Classification Search
USPC .............................. 200/11 TC, 238; 336/137
See application file for complete search history.

(56) References Cited

FOREIGN PATENT DOCUMENTS

| | | | |
|---|---|---|---|
| CN | 104205273 | A | 12/2014 |
| CN | 204464168 | U | 7/2015 |
| FR | 2066439 | A5 | 8/1971 |
| GB | 1585352 | A | 3/1981 |
| JP | S5138409 | B1 | 10/1976 |

OTHER PUBLICATIONS

First Office Action for Chinese Patent Application No. 2021800621838, mailed Jul. 22, 2023, 6 pages.

* cited by examiner

SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

CROSS REFERENCE TO RELATED APPLICATIONS

This application is a 35 U.S.C. § 371 national stage application of PCT International Application No. PCT/EP2021/066664 filed on Jun. 18, 2021, which in turn claims foreign priority to European Application No. 20202954.2, filed on Oct. 21, 2020, the disclosures and content of which are incorporated by reference herein in their entirety.

FIELD

Switching system for an on-load tap changer, on-load tap changer and method for switching a tap connection of an on-load tap changer The present disclosure relates to a switching system for an on-load tap changer, e.g. a switching system for switching a tap connection of the on-load tap changer. The present disclosure further relates to an on-load tap changer comprising such a switching system and a method for switching a tap connection in particular by using a switching system disclosed herein.

BACKGROUND

On-load tap changers, for example, are built into power transformers and regulate their voltage under-load, i.e. without interrupting the power supply to consumers.

It is desirable to provide a switching system for an on-load tap changer that is reliable and allows an easy switching as well as a corresponding on-load tap changer and a corresponding method for switching a tap connection of an on-load tap changer.

SUMMARY

According to an embodiment a switching system for an on-load tap changer comprises:

a Geneva mechanism, wherein the Geneva mechanism comprises:

a rotatable ring with a recess, the rotatable ring, a connector, the connector being rotatable together with the rotatable ring to electrically connect with a tap of the tap changer, a rotatable driving wheel, wherein the driving wheel comprises a holding disk and a lever, the holding disk being rotatable around a longitudinal axis and wherein the lever is slidable radial to the longitudinal axis relative to the holding disk, and wherein the lever is coupleable with the recess to rotate the rotatable ring.

The switching system allows an application of a Geneva mechanism in an on-load tap changer. The lever which is slidable with respect to the holding disk allows a small footprint of the mechanism. When not needed, for example when the driving wheel runs at idle and the lever is decoupled from the recess, the lever could be arranged to be retracted such that it does not protrude, or only slightly protrudes, over the holding disk. Shortly before the lever couples with the recess, the lever can be pulled out of the holding disk such that it protrudes further compared to the retracted position. During rotation and while coupled to the recess, the lever also slides with respect to the holding disk to compensate for the different distances between the holding disk and the recess. The slidable lever increases the freedom to provide different numbers of recesses. For example, also small numbers like three, four or five recesses are possible, that are spaced comparably far apart along the rotatable ring, for example 72° or less. The extended lever that protrudes from the holding disk makes a coupling with a spaced apart recess possible.

According to a further embodiment the switching system comprises a drive shaft. The drive shaft is rotatable around the longitudinal axis to rotate the driving wheel. The drive shaft is arranged eccentrically to the rotatable ring. The lever is slidable radial to the longitudinal axis relative to the drive shaft. The shifting movement and sliding movement of the lever equals the eccentric arrangement of the driving wheel at the drive shaft and the rotatable ring. This enables a space-saving arrangement of the drive shaft with the driving wheel and the lever inside the rotatable ring.

According to a further embodiment the switching system comprises a bearing arrangement to guide the sliding of the lever relative to the holding disk. The bearing arrangement is configured to guide the shifting movement of the lever with respect to the holding disk. Thus, the friction between the lever and the holding disk can be reduced and thereby the forces needed to move the lever can be reduced.

According to a further embodiment, the bearing arrangement comprises a plurality of bearings. The bearings are arranged at the lever. The bearings are coupled to the lever. For example, the bearings comprise ball bearings that are arranged to support the lever with respect to the holding disk and to guide the shifting movement of the lever.

According to a further embodiment, the system comprises a tensioning device. The tensioning device exerts a force on the lever in the direction away from the longitudinal axis. The tensioning device is arranged to push the lever towards its extended position. The lever can be shifted towards its retracted position against the force of the tensioning device. For example, the tensioning device comprises a coil spring or a plurality of coil springs. The coil spring is attached at one end to the lever and at the other end to the holding disk. When the spring contracts to its neutral position the lever is pushed in an outward direction with respect to the holding disk. When the lever is pushed towards an inward direction of the holding disk, the coil spring is extended.

Alternatively or in addition to the tensioning device the switching system comprises, according to a further embodiment, a guiding arrangement. The guiding arrangement is configured to guide a movement of the lever into a state in which the lever is decoupled from the recess. With the aid of the guiding arrangement it is possible to control the position of the lever with respect to the holding disk even when the lever is not coupled with the recess. Thus, it is, for example, possible to keep the lever in the retracted position when the lever is not used. This helps to provide the mechanism with low space and installation specifications. The guiding arrangement is configured to pull the lever towards its extended position shortly before the lever couples with the recess. Thus it is possible to couple the lever with the recess at a favorable position in terms of forces that are needed to rotate the rotatable ring. For example, this makes a small amount of recesses possible, such as five recesses or less.

For example, the guiding arrangement comprises a guiding groove and a pin. The guiding groove is installed such that the driving wheel is rotatable relative to the guiding groove. For example, the rotatable ring is also rotatable relative to the guiding groove. The pin is attached to the lever and guided in the groove in the state in which the lever is decoupled from the recess. Thereby the sliding of the lever is guided. For example, the guiding groove runs with a larger distance from the longitudinal axis at both ends than in a middle part. The middle part of the guiding groove is arranged closer to the holding disk than at the open ends of the guiding groove. The open ends of the guiding groove are spaced apart from the holding disk and arranged next to the rotatable ring to enable a reliable coupling and decoupling of the lever between the recess and the guiding groove.

According to a further embodiment, the holding disk comprises a guiding slot. The lever is slidably supported in the guiding slot. For example, the bearing arrangement is arranged to guide the movement of the lever in the guiding slot. The guiding slot enables a secure fastening of the lever in the holding disk and thereby allows the shifting movement of the lever relative to the holding disk.

According to a further embodiment, the switching system comprises a further Geneva mechanism. For example, the further Geneva mechanism is configured and designed like the first Geneva mechanism described herein. The Geneva mechanism and the further Geneva mechanism correspond to each other in a way that each Geneva mechanism comprises a rotatable driving wheel with a holding disk and a slidable lever. For example, the first Geneva mechanism is arranged to connect the respective connector to a tap at odd positions. The further Geneva mechanism, for example, is arranged to connect the respective connector to taps at even positions. For example, the respective rotatable rings of the Geneva mechanism and the further Geneva mechanism are turned alternately. The Geneva mechanism and the further Geneva mechanism, for example, are arranged axially offset from each other. For example, the drive shaft is arranged to rotate the driving wheels of both Geneva mechanisms and the Geneva mechanism and the further Geneva mechanism are arranged axially opposite to each other along the longitudinal axis of the drive shaft.

According to an embodiment, an on-load tap changer comprises a switching system according to at least one embodiment described herein. The on-load tap changer comprises a housing. The switching system is arranged inside the housing. The housing surrounds the rotatable ring coaxially. The tap changer comprises the tap and the tap is fixed to the housing. For example, the on-load tap changer comprises a plurality of taps, in particular four, five, six, seven, eight, ten, eleven, twelve, thirteen, fourteen or more taps. For example, the number of taps is divided equally in two or more levels and one Geneva mechanism is provided for each level of taps. The taps are, for example, arranged into ring-shaped arrangements which are axially offset from each other.

According to an embodiment, a method for switching a tap connection of an on-load tap changer comprises:

- rotating a driving wheel around a longitudinal axis, the driving wheel comprising a lever,
- coupling the lever to a recess of a rotatable ring,
- rotating the rotatable ring driven by the lever, and thereby rotating a connector relative to a tap of the on-load tap changer, and
- sliding the lever radial to the longitudinal axis while the lever is coupled to the recess.

According to a further embodiment, method comprises decoupling the lever from the recess. For example, the lever is coupled with a guiding groove. The lever is slid radial to the longitudinal axis while the lever is decoupled from the recess. The lever is guided due to its coupling with the recess while the lever is coupled with the recess. For example, the lever is guided due to its coupling with the guiding groove while the lever is decoupled from the recess. Alternatively or in addition, the tensioning device affects the position of the lever relative to the holding disk while the lever is decoupled from the recess. Thus, a defined positioning of the lever with respect to the holding disk is possible in the extended state of the lever as well as in the retracted state of the lever.

For example, the method for switching the tap connection is performed with the aid of the switching system described herein. Features and advantages described with the switching system also apply to the method and the other way around.

BRIEF DESCRIPTION OF THE DRAWINGS

The present disclosure will be further described with reference to the accompanying drawings, wherein.

Throughout the drawings, identical components and components of the same type and effect may be represented by the same reference signs.

DETAILED DESCRIPTION

Figure 1:
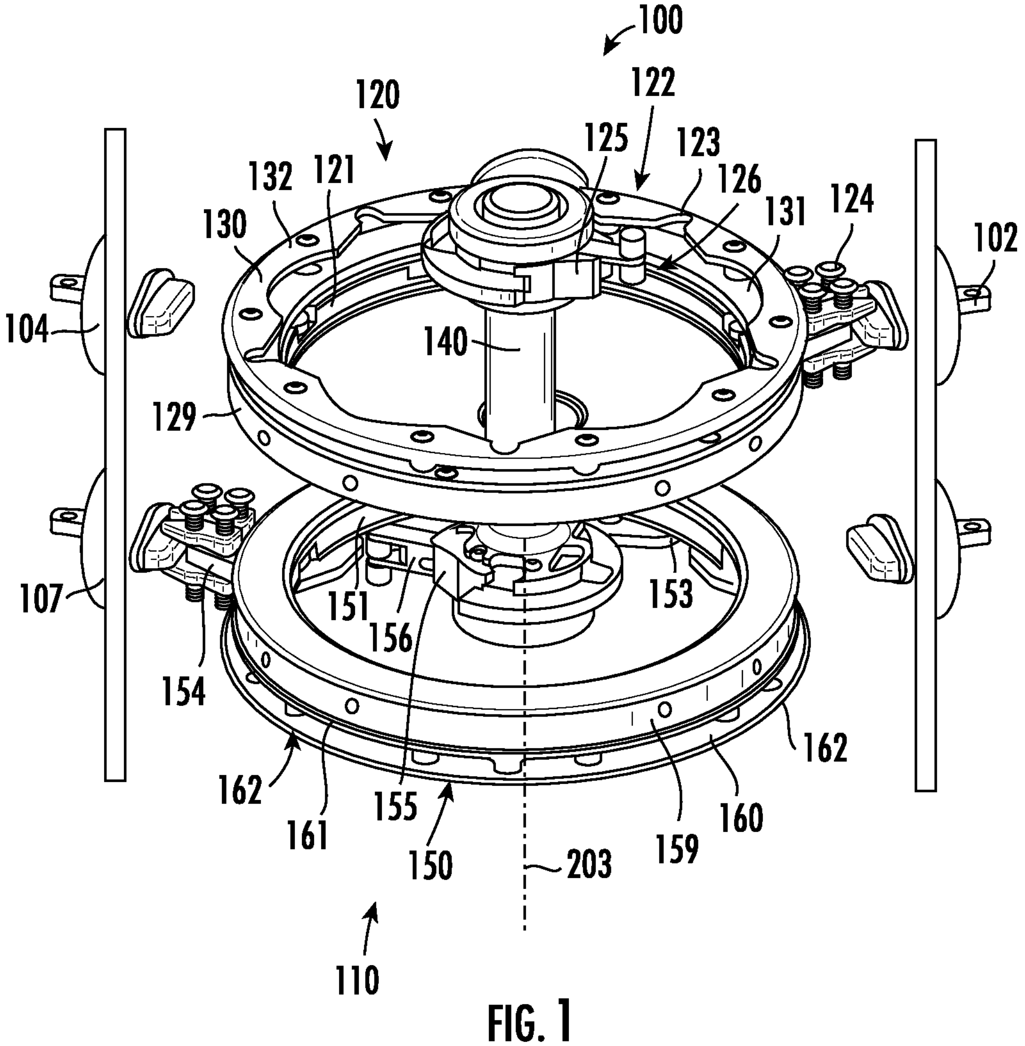
FIG. 1 is a schematic view of an on-load tap changer according to an embodiment.

FIG. 1 shows an exemplary embodiment of an on-load tap changer 100 at least in parts.

The on-load tap changer is configured for regulation of the output voltage of a power transformer to appropriate levels. With the aid of the on-load tap changer the turn ratios of the transformer can be altered. As cylindrical housing 101 surrounds a switching system 110. Taps 102 to 108 are arranged in circular forms at the housing. For example, the taps 102 to 108 are arranged in two circles that are offset from each other with respect to a longitudinal axis of the housing 101.

A drive shaft 140 is arranged inside the housing 101. The drive shaft 140 can be driven by a motor or another actuator to rotate around its longitudinal axis. The drive shaft 140 drives a first Geneva mechanism 120 and a further Geneva mechanism 150. The further Geneva mechanism 150 may also be referred to as the second Geneva mechanism 150. The first Geneva mechanism 120 and the further Geneva mechanism 150 are constructed in the same way. Therefore, features and advantages described in connection with one of the Geneva mechanisms 120, 150 apply to the other one of the Geneva mechanisms 120, 150.

The Geneva mechanism 120 comprises a holder 121. The holder 121 is immovable with respect to housing 101. The holder is a ring-shaped element that is configured and designed to hold further elements of the Geneva mechanism 120 that may rotate to the housing 101 and the holder 121.

The Geneva mechanism 120 comprises a rotatable ring 122. The rotatable ring 122 is coupled to the holder 121. The rotatable ring 122 is supported by the holder 121 such that the rotatable ring 122 is rotatable with respect to the holder 121. Thereby, the rotatable ring 122 is rotatable relative to the housing 101 and the taps 102 to 106 as well. The housing 101, the holder 121 and the rotatable ring 122 are arranged coaxially. The drive shaft 140 is arranged eccentrically inside the housing 101 offset to the longitudinal axis around which the rotatable ring 122 rotates.

The rotatable ring 122 comprises a current carrier ring 129. The current carrier ring 129 is made out of an electrically conductive material and is configured to conduct electrical current.

The rotatable ring 122 comprises a drive ring 130. The drive ring 130 comprises a plurality of recesses 123. For example, the drive ring 130 comprises as many recesses 123 as taps 102 to 106 are arranged in the corresponding line at the housing 101. For example, the drive ring 130 comprises five recesses 123 and five taps 102 to 106 are arranged at the circumference of the drive ring 130 at the housing 101 (see also FIG. 2). For example, the recesses 123 are formed in a Geneva ring 132 that is part of the drive ring 130. The Geneva ring 132 comprises the recesses and is connected to an intermediate ring 131 of the drive ring 130. This allows a decoupling of the Geneva ring 132 from the current carrier ring 129 and an easy mounting.

The recesses 123 are open to an inner side of the rotatable ring 122. The recesses 123 penetrate into the rotatable ring 122 from a central inner side. Thus, an internal Geneva mechanism 120 is realized.

The intermediate ring 131 is mechanically connected to the current carrier ring 129. The Geneva ring 132 is mechanically connected to the intermediate ring 131. The intermediate ring 131 is arranged between the current carrier ring 129 and the Geneva ring 132.

A connector 124 is electrically and mechanically connected with the current carrier ring 129. The connector 124 is configured and designed to couple with one of the respective taps 102 to 106 to conduct electrical current between the current carrier ring 129 and the respective tap 102 to 106. By rotating the current carrier ring 129 together with the connector 124, the connector 124 can be connected to a desired one of the respective taps 102 to 106.

The rotation of the current carrier ring 129 is caused by a rotation of the drive shaft 140. The rotation of the drive shaft 140 is transmitted to the rotatable ring 122 via a driving wheel 125. The driving wheel 125 is connected to the drive shaft 140 and rotates together with the drive shaft 140. The driving wheel 125 comprises a protrusion 126, for example in form of a lever 202 (see FIGS. 2 and 3). The protrusion protrudes radially with respect to the drive shaft 140. The protrusion 126 is configured to interact and engage with the recess 123. When the protrusion engages the recess 123, the rotatable ring 122 rotates together with the driving wheel 125. Thereby the connector 124 is moved from one tap, for example tap 102, to the directly adjacent next tap, for example tap 103. After the protrusion 126 leaves the recess 123, the rotatable ring 122 stands still and the driving wheel 125 rotates relatively to the rotatable ring 122. The rotation of the driving wheel 125 is not transmitted to the rotatable ring 122. Thus, the driving wheel 125 rotates uniformly and the rotatable ring 122 rotates step-by-step between specific positions. These specific positions correspond to the positions of the taps 102 to 106.

The second Geneva mechanism 150 is configured in a same way.

The second Geneva mechanism 150 comprises a second holder 151. The holder second 151 is immovable with respect to housing 101. The second holder is a ring-shaped element that is configured and designed to hold further elements of the second Geneva mechanism 150 that may rotate to the housing 101 and the second holder 151.

The second Geneva mechanism 150 comprises a second rotatable ring 152. The second rotatable ring 152 is coupled to the second holder 151. The second rotatable ring 152 is supported by the second holder second 151 such that the second rotatable ring 152 is rotatable with respect to the second holder 151. Thereby, the second rotatable ring 152 is rotatable relative to the housing 101 and the taps 102 to 107 as well. The housing 101, the second holder 151 and second the rotatable ring 152 are arranged coaxially. The drive shaft 140 is arranged eccentrically inside the housing 101 offset to the longitudinal axis around which the second rotatable ring 152 rotates.

The second rotatable ring 152 comprises a second current carrier ring 159. The second current carrier ring 159 is made out of an electrically conductive material and is configured to conduct electrical current.

The second rotatable ring 152 comprises a second drive ring 160. The second drive ring 160 comprises a plurality of recesses 153. For example, the second drive ring 160 comprises as many recesses 153 as taps 107, 108 are arranged in the corresponding line at the housing 101. For example, the second drive ring 160 comprises five recesses 153 and five taps 107, 108 are arranged at the circumference of the second drive ring 160 at the housing 101. For example, the recesses 153 are formed in a second Geneva ring 162 that is part of the second drive ring 160. The second Geneva ring 162 comprises the recesses 153 and is connected to a second intermediate ring 161 of the second drive ring 160. This allows a decoupling of the second Geneva ring 162 from the second current carrier ring 159 and an easy mounting.

The recesses 153 are open to an inner side of the second rotatable ring 152. The recesses 153 penetrate into the second rotatable ring 152 from a central inner side. Thus, an internal Geneva mechanism 150 is realized.

The second intermediate ring 161 is mechanically connected to the second current carrier ring 159. The second Geneva ring 162 is mechanically connected to the second intermediate ring 161. The second intermediate ring 161 is arranged between the second current carrier ring 159 and the second Geneva ring 162.

A second connector 154 is electrically and mechanically connected with the second current carrier ring 159. The second connector 154 is configured and designed to couple with one of the respective taps 107, 108 to conduct electrical current between the second current carrier ring 159 and the respective tap 107, 108. By rotating the current second carrier ring 159 together with the second connector 154, the second connector 154 can be connected to a desired one of the respective taps 107, 108.

The rotation of the second current carrier ring 159 is caused by a rotation of the drive shaft 140. The rotation of the drive shaft 140 is transmitted to the second rotatable ring 152 via a second driving wheel 155. The second driving wheel 155 is connected to the drive shaft 140 and rotates together with the drive shaft 140. The second driving wheel 155 comprises a second protrusion 156, for example in form the lever 202. The second protrusion 156 protrudes radially with respect to the drive shaft 140. The second protrusion 156 is configured to interact and engage with the recesses 153. When the second protrusion 156 engages the recess 153, the second rotatable ring 152 rotates together with the second driving wheel 155. Thereby the second connector 154 is moved from one tap, for example tap 107, to the directly adjacent next tap in the corresponding level. After the second protrusion 156 leaves the recess 153, the second rotatable ring 152 stands still and the second driving wheel 155 rotates relatively to the second rotatable ring 152. The rotation of the second driving wheel 155 is not transmitted to the second rotatable ring 152. Thus, the second driving wheel 155 rotates uniformly and the second rotatable ring 152 rotates step-by-step between specific positions. These specific positions correspond to the positions of the corresponding taps 107, 108.

The further protrusion 156 of the second Geneva Mechanism 150 is offset to the protrusion 126 of the first Geneva mechanism 120. Thus, the rotatable ring 122 of the first Geneva mechanism 120 and the further rotatable ring 152 of the further Geneva mechanism 150 can be moved successively one after another. When the protrusion 126 engages the recess 123 and moves the rotatable ring 122, the further protrusion 156 runs at idle and does not move the further rotatable ring 152. After disconnection of the protrusion 126 out of the recess 123, the further protrusion 156 engages the further recess 153 and the further rotatable ring 152 moves. Thus, it is possible to drive the Geneva mechanism 120 and the further Geneva mechanism 150 with the same drive shaft 140. The driving wheel 125 and the further driving wheel 155 are connected to the drive shaft 140 and move uniformly. For example, with the Geneva mechanism 120 the even numbers of the connections of the tap changer 100 are connectable and with the further Geneva mechanism 150 the odd numbers of the connections of the tap changer 100 are connectable.

More than two Geneva mechanisms with rotatable rings driven by a drive wheel of the drive shaft 140 are possible, for example three, four or more Geneva mechanisms, like Geneva mechanism 120.

Figure 2:
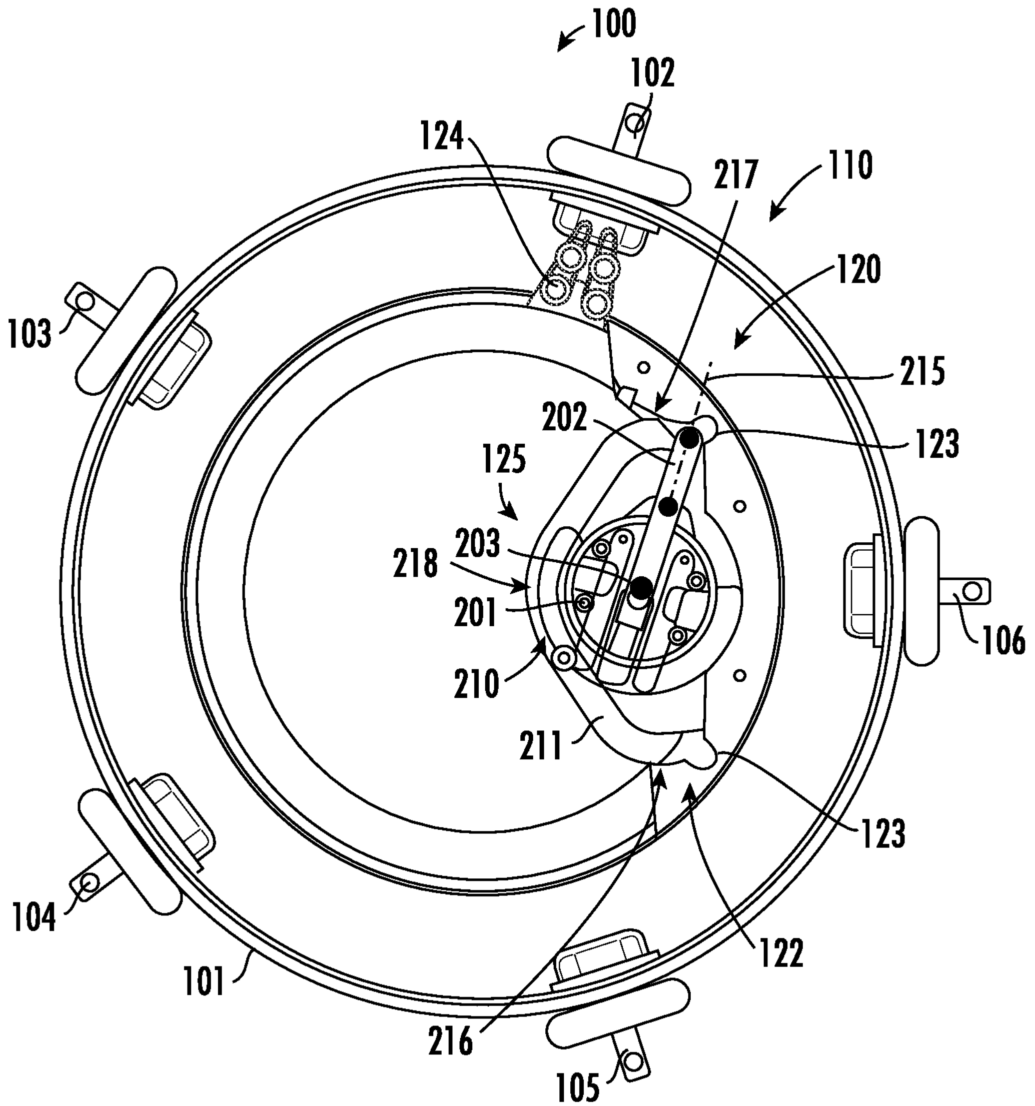
FIG. 2 is a schematic view of the on-load tap changer according to an embodiment.

FIG. 2 shows a schematic top view on the on-load tap changer 100.

The switching system 110 is further explained in connection with the Geneva mechanism 120. The further Geneva mechanism 150 is designed and configured correspondingly and the explanations are also applicable to the further second Geneva mechanism 150.

The driving wheel 125 is rotatable about a longitudinal axis 203. The longitudinal axis 203 is also the longitudinal axis and the rotation axis of the drive shaft 140. The driving wheel 125 comprises a holding disk 201. The holding disk 201 is rotatable together with the drive shaft 140.

The driving wheel 125 further comprises the lever 202. The lever 202 protrudes radially from the holding disk 201. The lever 202 is aligned transverse to the longitudinal axis 203. The lever 202 is coupled with the holding disk 201, such that the lever rotates together with the holding disk 201.

The lever 202 is shiftable and slidable with respect to the holding disk 201 along the longitudinal axis 215 of the lever. Thus it is possible to move the lever 202 between an extended position (shown in FIG. 2) and a retracted position. In the retracted position, the lever 202 is arranged more inside the holding disk 201 and protrudes less far than in the extended position.

In the extended position of the lever 202, the lever 202 can couple with the recess 123. The rotation of the holding disk 201 is transmitted to the rotatable ring 122 via the lever 202. Thus, the connector 224 is movable to a next tap, for example the tap 103 in FIG. 2. After the movement of the connector 124 to a next tap, the lever 202 decouples from the recess 123. This state is shown in FIG. 2.

During the rotation of the lever 202 together with the rotatable ring 122, the lever 202 is slid from its extended position towards its retracted position (about half of the way of the rotation to move the connector 124 to a next tap). Afterwards, the lever 202 is again moved towards its extended position as shown in FIG. 2 before the lever 202 decouples from the recess 123. This sliding movement of the lever 202 is due to the eccentric alignment of the drive shaft 140 with the holding disk 201 and the rotatable ring 122.

After decoupling from the recess 123, the lever 202 rotates at idle with respect to the rotatable ring 122. During this idle movement, the lever 202 is moved towards its retracted position to save space inside the housing 101.

A guiding arrangement 210 is arranged to guide the sliding movement of the lever 202 with respect to the holding disk 201 in the state in which the lever 202 is decoupled from the recess 123. The guiding arrangement 202 is configured to define a position of the lever 202 with respect to the holding disk 201 along the longitudinal axis 215 of the lever 202.

For example, the guiding arrangement 210 comprises a guiding groove 211. The guiding groove 211 comprises a course such that the lever 202 can couple into the guiding groove 211 after decoupling from the recess 123. For example, the lever 202 comprises a pin 212 (FIG. 3) that is guidable in the guiding groove 211. The course of the guiding groove 211 is designed such that the guiding groove 211 is spaced further apart from the axis 203 at the ends 216, 217 than in a middle part 218. The middle part 218 of the guiding groove 211 is arranged next to the holding disk 201 to pull the lever 202 into the holding disk 201. Both ends 216, 217 of the guiding groove 211 are positioned such that the lever 202 can easily and reliably couple with the recess 123 and decouple from the recess 123.

Figure 3:
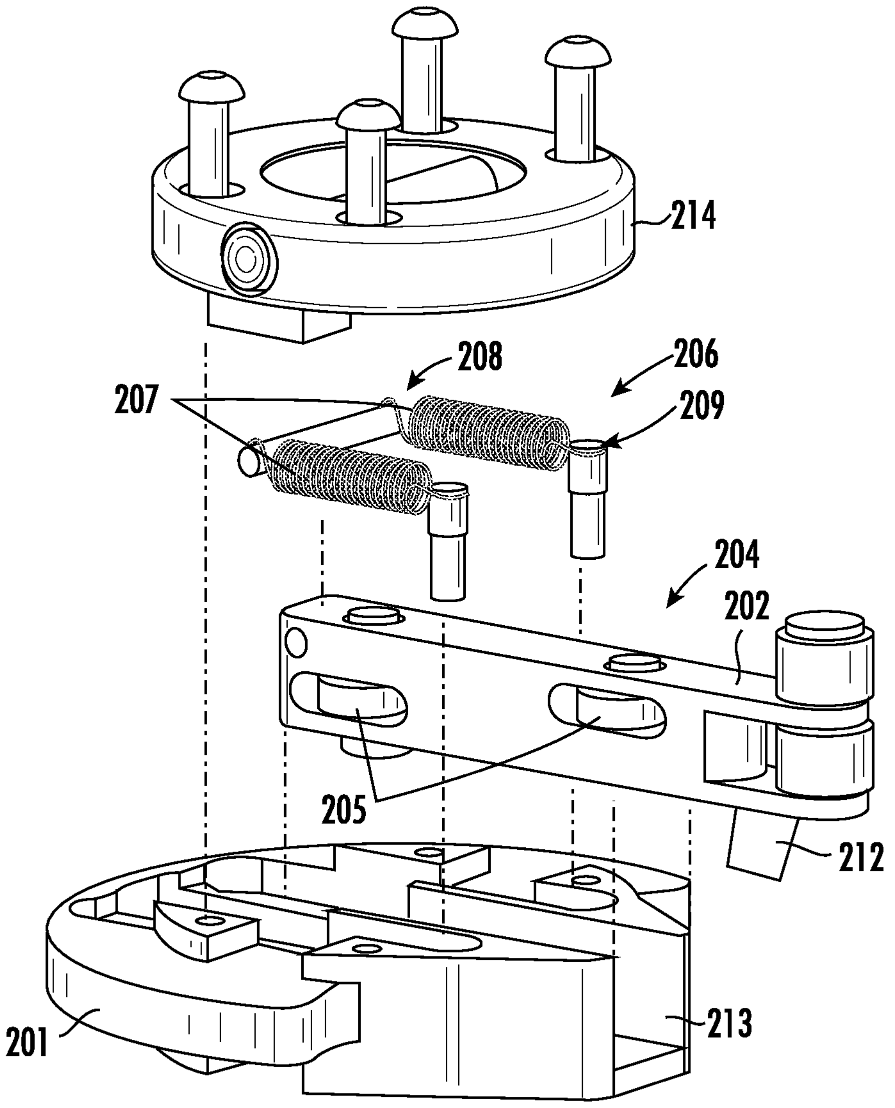
FIG. 3 is a schematic view of a part of a switching system according to an embodiment.

FIG. 3 shows the holding disk 201 and the lever 202 in an exploded view according to an embodiment. The lever comprises the pin 212 that is guidable in the guiding groove 211.

In addition, the switching system 110 according to the embodiment shown comprises a tensioning device 206. It is also possible according to further embodiments to provide the switching system 110 without the tensioning device 206 and to move the lever 202 with respect to the holding disk 201 only with the guiding arrangement 210.

The tensioning device 206 comprises two coil springs 207. It is also possible to have only one single coil spring 207 or more than two coil springs 207. One end 208 of the spring 207 is coupled with the lever 202, for example via a pin. The other end 209 of the spring 207 is fixed at the holding disk 201, for example via a further pin.

The spring 211 is arranged to exert a force on the lever 202 to push the lever 202 towards its protruding extended position. The lever 202 can be pushed into the holding disk 201 by an external force against the force of the spring 207 towards the retracted position of the lever 202. Thus, the tensioning device 206 makes it possible for the lever 202 to be in the right position to couple with the recess 123 for rotating the rotatable ring 122.

According to embodiments, whether the tensioning device 206 is present or not, the lever 202 is guided in a guiding slot 213 of the holding disk 201. The guiding slot 213 allows the shifting of the lever 202 with respect to the holding disk 201 along the longitudinal axis 215 of the lever 202. The guiding slot 213 reduces or prevents other movements of the lever 202 with respect to the holding disk 201, for example together with a cover 214. The cover 214 and the guiding slot 213 are designed such that the longitudinal sliding movement of the lever 202 is possible and that the lever 202 is held tightly by the holding disk 201 and the cover 214.

A bearing arrangement 204 is arranged to have a sliding movement of the lever 202 with respect to the holding disk 201 with low friction. For example, the bearing arrangement 204 comprises one or more bearings 205, for example ball bearings. The bearings 205 are fixed at the lever 202 and reduce friction between the lever 202 and the guiding slot 213. For example, the bearings reduce friction between the lever 202 and sidewalls of the guiding slot 213. Alternatively or in addition, further bearings reduce friction between the ground of the guiding slot 213 and the lever 202.

Figure 4:
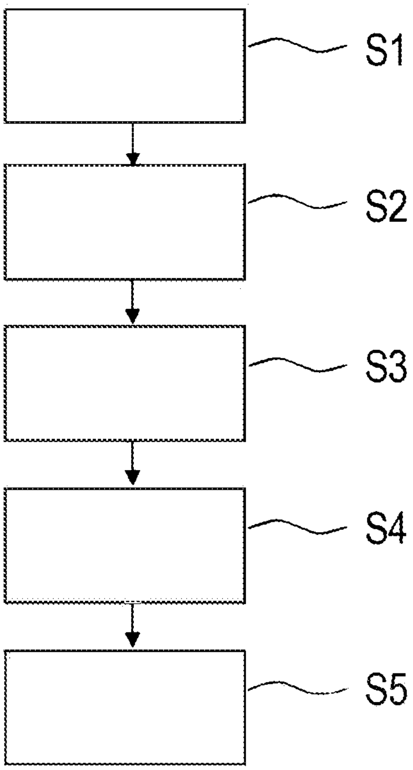
FIG. 4 is a flowchart of a method for switching a tap connection according to an embodiment.

FIG. 4 shows a flowchart of a method for switching a tap connection of the on-load tap changer 100 according to an embodiment. In a step S1 the driving wheel 125 is rotated around the longitudinal axis 203.

In a next S2 the lever 202 couples with the recess 123 of the rotatable ring 122.

The rotation of the lever 202 around the longitudinal axis 203 of the drive shaft 140 rotates the rotatable ring 122 (step S3).

The rotation of the rotatable ring rotates the connector 124 relative to the housing 101 and leads to a change of the tap that is connected with the connector 124.

In step S4 the lever 202 slides radial to the longitudinal axis 203 along the longitudinal axis 215 of the lever 202 while the lever is coupled to the recess 123.

For example, after the connector 124 is rotated to the desired tap, the lever decouples from the recess 123 (step S5). The lever 202 couples with the guiding groove 211. The guiding groove 211 guides the lever 202 while the holding disk 201 rotates relative to the rotatable ring 122 such that the lever 202 slides radial to the longitudinal axis 203 while the lever 202 is decoupled from the recess 123.

The lever 202 that is movable along its longitudinal axis 215 with respect to the holding disk 201 provides a telescopic mechanism for the internal Geneva mechanism 120, 150. The lever 202 is guided inside the holding disk 201 with the aid of the bearing arrangement 204 in the internal guiding groove 211. This allows a small dimension and a good integration of the switching system 110 in the on-load tap changer 100. The movable lever 202 decreases the overall footprint of the switching system 110, while still allowing the implementation of the Geneva-driven rotatable ring 122, 152 with multiple positions.

The on-load tap changer 100 with the Geneva mechanism 120, 150 reduces the complexity of the interconnected mechanisms and benefits the reliability of the overall system. The rotatable rings 122, 152 rotate independently by means of the respective driving wheels 125, 155 around the phase unit, for example the statically placed diverter switch of the phase of the on-load tap changer 100. The tap changer 100 with the Geneva mechanism 120, 150 allows a great flexibility in the selection of the number of individual positions of the connectors 124, 154, for example also few positions like four positions or a larger number like six positions for each connector 124, 154.

The holders 121, 151 and the rotatable rings 122, 152 are placed concentrically inside the insulation cylinder of the on-load tap changer 100. The switching operations between all odd and even positions of the tap changer 100, respectively the movement of the selector, are performed via the driving wheels 125, 155. The rotatable ring 122 of the first Geneva mechanism 120 and the lever 202 of the driving wheel 125 are angularly displaced in relation to the further rotatable ring 152 and the further lever 202 of the further driving wheel 155. Thus, by performing a switching operation both rotatable rings 122, 152 move in a subsequent motion and thereby select the relevant tap position.

The telescopic Geneva mechanism 120, 150 comprises the holding disk 201 with the guiding groove 211, the telescopic lever 202, the optional tensioning device 206 and the cover 214. While engaging the rotatable ring 122, the telescopic lever 202 is in its outer maximal position transferring a force transmitted through the coupling of the lever 202 and the recess 123. After this engagement the lever 202 is retracted back inside the holding disk 201. The movement of the lever 202 can also be only guided by the guiding arrangement 210 without the tensioning device 206 or only by the tensioning device 206 without the guiding arrangement 210. In the different embodiments of the switching system 110 the slidable lever 202 makes a compact and reliable design of Geneva mechanisms 120, 150 possible.

REFERENCE SIGNS

100 on-load tap changer
101 housing
102, 103, 104, 105, 106, 107, 108 tap
110 switching system
120 Geneva mechanism
121 holder
122 rotatable ring
123 recess
124 connector
125 driving wheel
126 protrusion
129 current carrier ring
130 drive ring
131 intermediate ring
132 geneva ring
133 mounting
140 drive shaft
150 further Geneva mechanism
151 further holder
152 further rotatable ring
153 further recess
154 further connector
155 further driving wheel
156 further protrusion
159 further current carrier ring
160 further drive ring
161 further intermediate ring
162 further geneva ring
201 holding disk
202 lever
203 axis
204 bearing arrangement
205 bearing
206 tensioning device
207 coil spring
208, 209 end of the spring
210 guiding arrangement
211 guiding groove
212 pin
213 guiding slot
214 cover
215 longitudinal axis of the lever
216, 217 end
218 middle part
S1-S5 method steps

The invention claimed is:

1. A switching system for an on-load tap changer, comprising:
- a Geneva mechanism, the Geneva mechanism comprising:
  - a rotatable ring with a recess,
  - a connector, the connector being rotatable together with the rotatable ring to electrically connect with a tap of the tap changer, and a rotatable driving wheel, the driving wheel comprising a holding disk and a lever, the holding disk being rotatable around a longitudinal axis and the lever being slidable radial to the longitudinal axis relative to the holding disk, and the lever being coupleable with the recess to rotate the rotatable ring; and a guiding arrangement, the guiding arrangement being configured to guide a movement of the lever in a state in which the lever is decoupled from the recess.

2. The switching system according to claim 1, comprising:

a drive shaft, the drive shaft being rotatable around the longitudinal axis to rotate the driving wheel, wherein the drive shaft is arranged eccentrically to the rotatable ring, and wherein the lever is slidable radial to the longitudinal axis relative to the drive shaft.

3. The switching system according to claim 1, comprising:

a bearing arrangement to guide the sliding of the lever relative to the holding disk.

4. The switching system according to claim 3, wherein the bearing arrangement comprises a plurality of bearings, the bearings being arranged at the lever.

5. The switching system according to claim 1, comprising a tensioning device, the tensioning device exerting a force on the lever in a direction away from the longitudinal axis.

6. The switching system according to claim 5, wherein the tensioning device comprises a coil spring, wherein the coil spring is attached at one end to the lever and at the other end to the holding disk.

7. The switching system according to claim 1, wherein the guiding arrangement comprises a guiding groove and a pin, wherein the driving wheel is rotatable relative to the guiding groove, and wherein the pin is attached to the lever and guided in the guiding groove in the state in which the lever is decoupled from the recess to guide the sliding of the lever.

8. The switching system according to claim 1, wherein the holding disk comprises a guiding slot, the lever being slidably supported in the guiding slot.

9. The switching system according to claim 1, comprising:

a further Geneva mechanism which corresponds to the Geneva mechanism, wherein the Geneva mechanism and the further Geneva mechanism are arranged axially offset from each other.

10. An on-load tap changer, comprising:

the switching system according to claim 1, a housing, the switching system being arranged inside the housing and the housing surrounding the rotatable ring coaxially, the tap, wherein the tap is fixed to the housing.

11. A method for switching a tap connection of an on-load tap changer, comprising:

rotating a driving wheel around a longitudinal axis, the driving wheel comprising a lever, coupling the lever to a recess of a rotatable ring, rotating the rotatable ring driven by the lever, thereby rotating a connector relative to a tap of the on-load tap changer, exerting a force, by a coil spring attached between the lever and a holding disk of the driving wheel, on the lever in a direction away from the longitudinal axis, and sliding the lever radial to the longitudinal axis while the lever is coupled to the recess.

12. The method according to claim 11, comprising:

decoupling the lever from the recess, and sliding the lever radial to the longitudinal axis while the lever is decoupled from the recess.

13. The method according to claim 11, wherein the driving wheel, the rotatable ring, and the connector are part of a Geneva mechanism.

14. The method according to claim 11, further comprising:

guiding a movement of the lever, by a guiding groove and a pin, in a state in which the lever is decoupled from the recess, wherein the driving wheel is rotatable relative to the guiding groove, and wherein the pin is attached to the lever and guided in the guiding groove in the state in which the lever is decoupled from the recess to guide the sliding of the lever.

15. A switching system for an on-load tap changer, comprising:

a first Geneva mechanism comprising:

a rotatable ring with a recess, a connector, the connector being rotatable together with the rotatable ring to electrically connect with a tap of the tap changer, a rotatable driving wheel, the driving wheel comprising a holding disk and a lever, the holding disk being rotatable around a longitudinal axis, the lever being slidable radial to the longitudinal axis relative to the holding disk, and the lever being coupleable with the recess to rotate the rotatable ring;

a second Geneva mechanism arranged axially offset from the first Geneva mechanism; and a drive shaft, the drive shaft being rotatable around the longitudinal axis to rotate the driving wheel, wherein the drive shaft is arranged eccentrically to the rotatable ring, and wherein the lever is slidable radial to the longitudinal axis relative to the drive shaft.

16. The switching system according to claim 15, comprising:

a bearing arrangement to guide the sliding of the lever relative to the holding disk.

17. The switching system according to claim 16, wherein the bearing arrangement comprises a plurality of bearings, the bearings being arranged at the lever.

* * * * *